United States Patent [19]
Leou

[11] Patent Number: 5,923,445
[45] Date of Patent: Jul. 13, 1999

[54] APPARATUS AND METHOD OF SCAN COMPOSING FOR A LARGE ORIGINAL

[75] Inventor: Frun Leou, Hsinchu, Taiwan

[73] Assignee: Mustek Systems Inc., Hsinchu, Taiwan

[21] Appl. No.: 08/927,520

[22] Filed: Sep. 11, 1997

[51] Int. Cl.⁶ .............................. H04N 1/04; H04N 1/387
[52] U.S. Cl. ........................ 358/474; 358/497; 358/496; 358/450
[58] Field of Search .................................. 358/497, 496, 358/474, 471, 450, 401, 400, 487, 451, 488, 296; 355/75; 399/379, 380, 213

[56] References Cited

U.S. PATENT DOCUMENTS

| | | | |
|---|---|---|---|
| 4,922,292 | 5/1990 | Watanabe | 355/75 |
| 5,097,350 | 3/1992 | Baran | 358/401 |
| 5,280,330 | 1/1994 | Baba | 355/75 |

*Primary Examiner*—Edward L. Coles
*Assistant Examiner*—Cheukfan Lee
*Attorney, Agent, or Firm*—McDermott, Will & Emery

[57] ABSTRACT

A scanning apparatus and method for automatically composing scanned images is disclosed. The present invention includes a scanner having a first platen, wherein the first platen has a first length, and an intermediate frame set on the scanner. The present invention also includes a top plate set on the intermediate frame, wherein the top plate has a second platen which has a second length larger than the first length. Finally, driving means is attached to the intermediate frame for sliding the top plate on the intermediate frame, so that the top plate moves in a direction along the second length of the top plate.

20 Claims, 5 Drawing Sheets

APPARATUS AND METHOD OF SCAN COMPOSING FOR A LARGE ORIGINAL

BACKGROUND OF THE INVENTION

1. Field of the Invention

The present invention relates to image composing, and particularly to a method and apparatus of automatically composing scanned images.

2. Description of the Prior Art

Digitizing devices, such as scanners and digital cameras, convert photos, artwork, and the raw materials of the real world into digital data, which can be edited, processed, manipulated, or stored by specific application programs. Flatbed scanner is one of the most common types of scanners, which comes in many shapes and sizes. There is a downward trend in size of scanners, especially those used at home or office when economy and space are taken into consideration. However, these downsized scanners or normal sized scanners having, for example, a platen in standard A4 size, are rendered useless when scanning an original document larger than its platen size. In order to overcome this disadvantage, someone proposes a composing method that is implemented by a software program to join up two or more consecutively scanned digitized documents. This composing method disadvantageously requires user's interaction, in which the user makes an effort to place the large-sized document twice on the platen. Furthermore, at least some overlap between these two placements is required to guarantee the success in composing a resultant large-sized scan by the composing method. Moreover, the scanning task will become hard work when scanning a great number of large-sized documents in this conventional way. It is, therefore, desirable to propose an apparatus that automatically scans large-sized documents in small-sized scanners effortlessly without users'interaction.

SUMMARY OF THE INVENTION

In accordance with the present invention, a scanning apparatus and method is provided for automatically composing scanned images. In one embodiment, the apparatus includes a scanner having a first platen which has a first length, and an intermediate frame set engageably on the scanner. A top plate is set slidably on the intermediate frame, the top plate having a second platen, and the second platen having a second length larger than the first length. Also, driving means is attached to the intermediate frame for sliding the top plate on the intermediate frame, the top plate moving in a direction along the second length of the top plate. The apparatus also includes means for guiding the top plate slidably on the intermediate frame, and an opaque cover hinged on the top plate, the cover having substantially the same size as the top plate.

In the operative mode of the apparatus, initially aligning one end of the scanner with one end of the slidable top plate, and first scanning a document to generate a first scanned image, wherein the document has a size larger than the scanner. Next, move the slidable top plate in a distance approximately the length of the scanner. After additionally scanning the document to generate at least a second scanned image until the other end of the slidable top plate reaches the other end of the scanner, join in the first scanned image and the second scanned image, thereby composing a resultant image having a size substantially the same as the document.

DESCRIPTION OF THE PREFERRED EMBODIMENT

Figure 1:
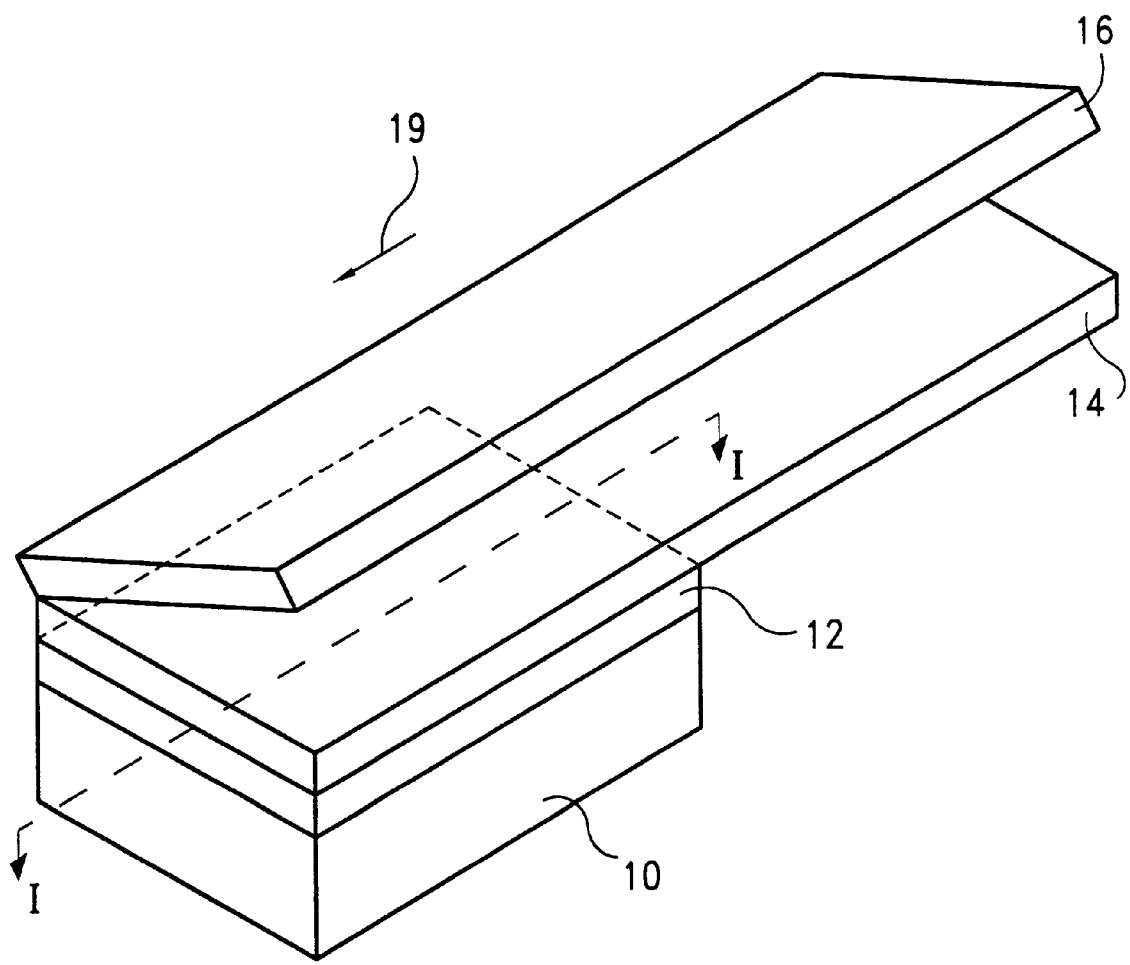
FIG. 1 is a perspective view of the composing scanning apparatus embodying the present invention shown in an operative mode.
Figure 2:
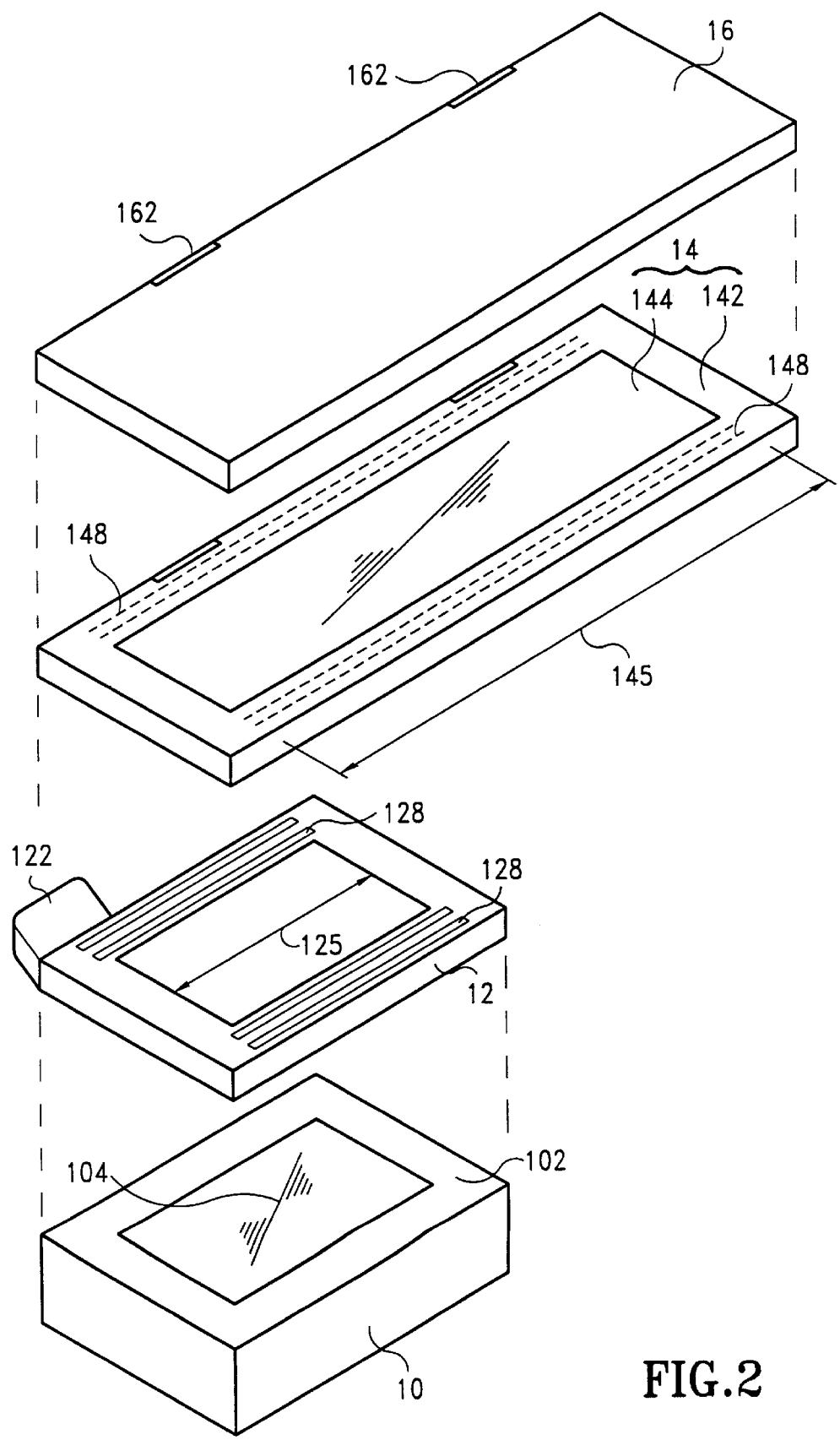
FIG. 2 illustrates parts of FIG. 1 in detail.

FIG. 1 is a perspective view of the composing scanning apparatus embodying the present invention shown in an operative mode. FIG. 2 illustrates parts of FIG. 1 in detail, wherein like reference numerals apply to similar parts throughout the figures. Scanner 10 is a conventional type of flatbed scanner. On top of the scanner 10 generally includes a frame 102 and a platen 104, usually a plate of glass, secured thereto. The platen 104 is used for placing an original document thereon, and passing light from a light source (not shown) inside the scanner 10, wherein the light is reflected back to a linear array of light detecting devices (not shown), such as charge-coupled devices (CCDs) inside the scanner 10. In this embodiment, the platen 104 has a size of approximate standard A4 size. It is appreciated that other size could be used without departing from the spirit of the present invention, which will become apparent after having described the embodiment in accordance with the present invention.

Figure 3A:
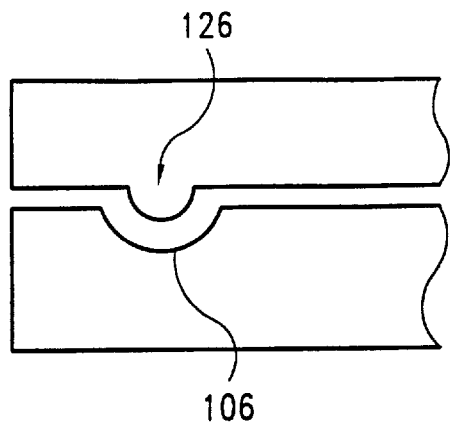
FIG. 3A shows an enlarged sectional view taken on lines I—I of FIG. 1.

Set engagingly on the scanner 10 is an intermediate frame 12 having an inner opening, which, in this embodiment, is supported at each of its corners by engaging a protruding upper face 126 into a hollow lower face 106 as shown in FIG. 3A, an enlarged sectional view taken on lines I—I of FIG. 1. Other conventional fastening method, such as using lock or friction means could be adapted in setting the intermediate frame 12 on the scanner 10. It is appreciated that the number of the positions of the engaging is immaterial. Generally, at least two corners are required in preventing the intermediate frame 12 from sliding in the operative mode.

Attached to the intermediate frame 12 is a driving means 122, which is used to drive a top plate 14 sidably on the intermediate frame 12, which will be described later. In this embodiment, a step motor is used for its accuracy in rotation and its compatibility with the digital electrical system of the scanner 10. This step motor 122 is electrically coupled to the scanner 10 by a conventional connector (not shown) and an electric cable (not shown) coupled thereto, which includes at least a ground line, a power line, and a control line.

The top plate 14 includes a frame 142 and a platen 144, for example, plate made of glass, secured thereto. As will be described later, the platen 144 is used to support an original document being scanned in the operative mode. The length 125 of the platen 144 is, in this embodiment, twice that of the platen 104. However, other ratio can be used provided that the weight of the top plate 14 can be supported by the scanner 10 balanceably.

The top plate 14 is driven by the motor 122 so that the top plate 14 moves slidably on the fixed intermediate frame 12.

Figure 3C:
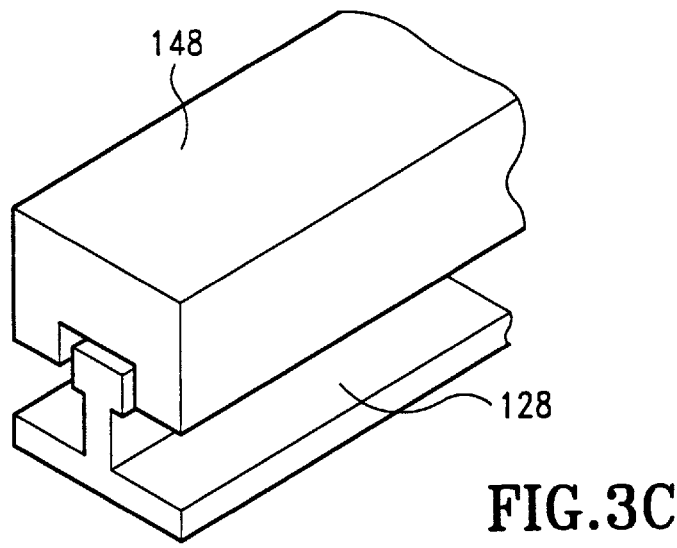
FIG. 3C schematically shows one embodiment of the guiding means.
Figure 3D:
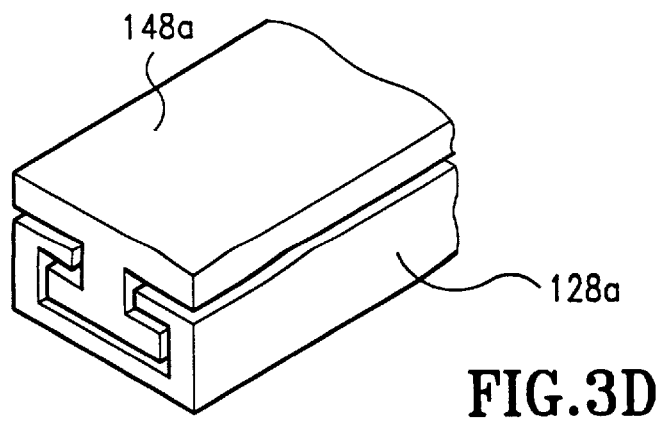
FIG. 3D schematically shows another embodiment of the guiding means.
Figure 3B:
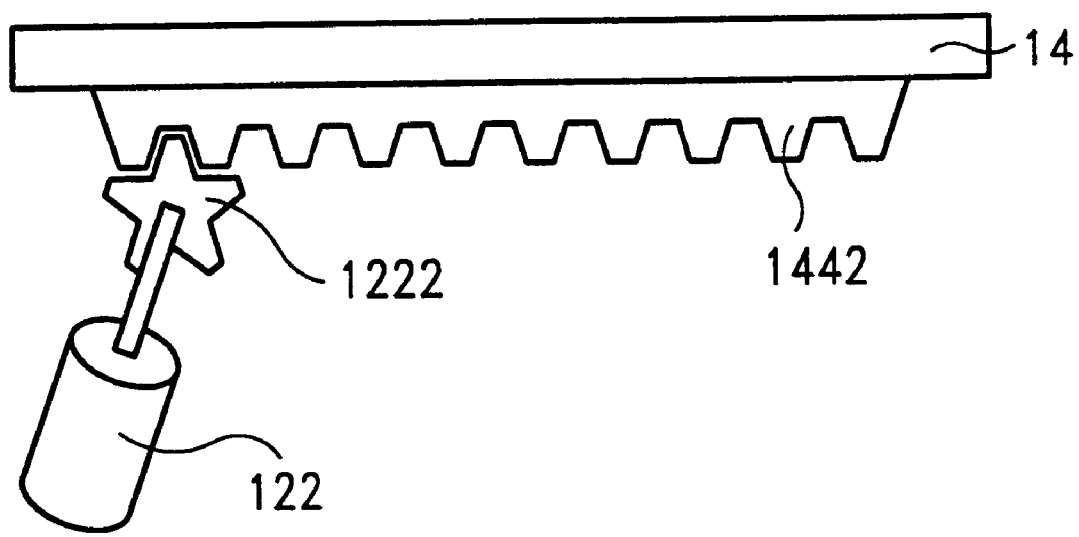
FIG. 3B schematically illustrates how the top plate is driven by the motor according to the embodiment of the present invention.

In this embodiment, this driving is accomplished by the gear shaft 1222 of the motor 122 and tooth rail 1442 set under and along the platen 144 of the top plate 14, as schematically illustrated in FIG. 3B.

Further, a guiding means 128 and 148 are devised respectively on the intermediate frame 12 and under the top plate 14, whereby both to guide the top plate 12 in a predetermined sliding direction 19 (FIG. 1) on the intermediate frame 12, and reduce the friction therebetween. In this embodiment, as shown in FIG. 3C, wherein only one of the two pairs is shown, an upper rail 148 is set slidably on the lower rail 128, therefore the top plate 14 is guided slidably along the direction of the length of the rails 148 and 128. FIG. 3D depicts another embodiment of the guiding means, which includes an upper rail 148a and a lower rail 128a. Compared to the embodiment illustrated in FIG. 3C, the guiding means in FIG. 3D can be specifically used to prevent the upper rail 148a from derailing. The length of the upper rail 148 is approximately equal to the length 145 of the glass platen 144 in the moving direction 19 (FIG. 1), and the length of the lower rail 128 is approximately equal to the inner length 125 of the intermediate frame 12 in the moving direction 19 (FIG. 1).

Atop of the top plate 14 is an opaque cover 16 hinged thereon by the hinge 162. This cover 16 serves as a good reflective plate, whereby to provide a background for the document being scanned.

Figure 4:
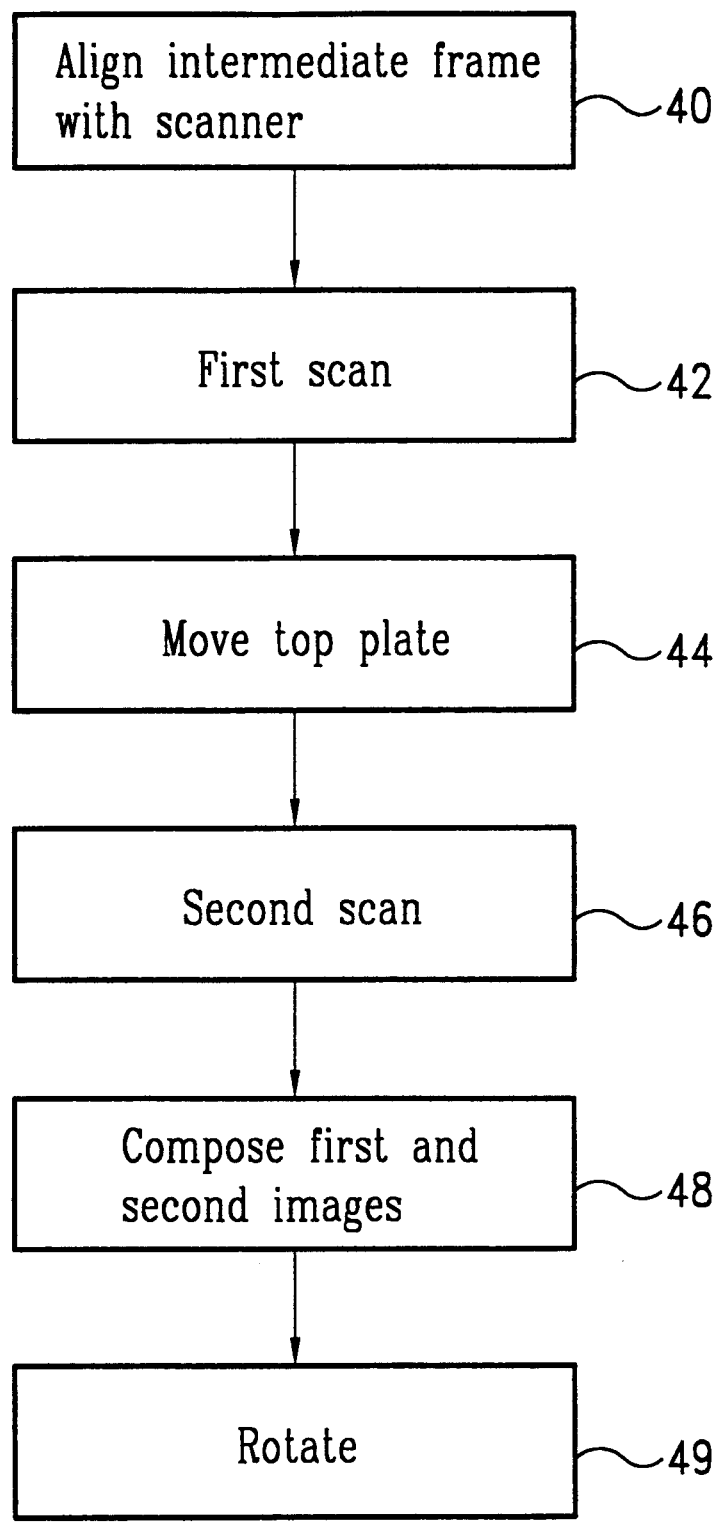
FIG. 4 shows a flow diagram illustrating the steps performed in the operative mode by the composing scanning apparatus of FIG. 1.

FIG. 4 shows a flow diagram illustrating the steps performed in the operative mode by the composing scanning apparatus 5 (FIG. 1) described above. Initially, the front end of the intermediate frame 12 is aligned approximately with the front end of the scanner 10 (block 40). After scanning is firstly performed (block 42), the top plate 14 and the cover 16 are driven by the motor 122, and move along the rails 128 and 148 (block 44) until the rear end of the top plate 14 reaches approximately the rear end of the scanner 10. Following a second scanning (block 46), the images generated respectively from the first scan and the second scan are composed (block 48) conventionally to generate a large-sized image. It is noted that an overlap is generally required between the first scan and the second scan, so that a conventional image composing method that is well known to skilled artisans can be applied. The joined-in large-sized image is then, when necessary, rotated 90° into an upright position (block 49) for being further edited, or manipulated. It is observed, in light of the disclosure, the times of scanning can be more than two, provided that the composing scan apparatus has top plate/scanner length ratio larger than two, and the composing software supports thereon.

Although specific embodiments have been illustrated and described, it will be obvious to those skilled in the art that various modifications may be made without departing from the spirit which is intended to be limited solely by the appended claims.

What is claimed is:

1. A scanning apparatus, comprising:
    a scanner having a first platen, said first platen having a first length;
    an intermediate frame set on said scanner;
    a top plate set on said intermediate frame, said top plate having a second platen, and said second platen having a second length larger than the first length; and
    means for driving said top plate on said intermediate frame, wherein said top plate can move in a direction along the second length of said top plate while in scanning, thereby generating a composed image comprising a plurality of sequential scanned images.

2. The apparatus according to claim 1, wherein an inner opening enclosed by said intermediate frame is substantially the same size as the first platen.

3. The apparatus according to claim 1, wherein said intermediate frame is supported at least two corners by engaging, at each of the corners, a protruding upper face under the surface of said intermediate frame into a hollow lower face on the surface of said scanner.

4. The apparatus according to claim 1, wherein said second length is two times the first length.

5. The apparatus according to claim 1, wherein said driving means comprises a motor electrically controlled by said scanner through a cable.

6. The apparatus according to claim 5, further comprising a gear shaft attached to the motor, and a tooth rail set under the surface of said top plate.

7. The apparatus according to claim 1, further comprising means for guiding said top plate slidably on said intermediate frame.

8. The apparatus according to claim 7, wherein said guiding means comprising a pair of first rails affixed on the surface of said intermediate frame, and a pair of second rails affixed under the surface of said top plate, so that the pair of second rails is set slidably on the pair of first rails.

9. The apparatus according to claim 1, further comprising an opaque cover hinged on the top plate, said cover having substantially the same size as the top plate.

10. The apparatus according to claim 1, wherein said intermediate frame is set engageably on said scanner.

11. The apparatus according to claim 1, wherein said top plate is set slidably on said intermediate frame.

12. The apparatus according to claim 1, wherein said driving means is attached to said intermediate frame.

13. A scanning apparatus, comprising:
    a scanner having a first platen, said first platen having a first length;
    an intermediate frame set engageably on said scanner;
    a top plate set slidably on said intermediate frame, said top plate having a second platen, and said second platen having a second length larger than the first length;
    driving means attached to said intermediate frame for sliding said top plate on said intermediate frame, wherein said top plate can move in a direction along the second length of said top plate, thereby generating a composed image comprising a plurality of sequential scanned images;
    means for guiding said top plate slidably on said intermediate frame; and
    an opaque cover hinged on the top plate, said cover having substantially the same size as the top plate.

14. The apparatus according to claim 13, wherein an inner opening enclosed by said intermediate frame is substantially the same size as the first platen.

15. The apparatus according to claim 13, wherein said intermediate frame is supported at least two corners by engaging, at each of the corners, a protruding upper face under the surface of said intermediate frame into a hollow lower face on the surface of said scanner.

16. The apparatus according to claim 13, wherein said second length is two times the first length.

17. The apparatus according to claim 13, wherein said driving means comprises a motor electrically controlled by said scanner through a cable.

18. The apparatus according to claim 17, further comprising a gear shaft attached to the motor, and a tooth rail set under the surface of said top plate.

19. The apparatus according to claim 13, wherein said guiding means comprising a pair of first rails affixed on the surface of said intermediate frame, and a pair of second rails affixed under the surface of said top plate, so that the pair of second rails is set slidably on the pair of first rails.

20. A composing scanning method, used with a scanner having a slidable platen thereon, said slidable platen having a size larger than that of the scanner, said method comprising:

aligning one end of the scanner with one end of the slidable platen;

first scanning a document to generate a first scanned image, said document having a size larger than said scanner;

moving said slidable platen in a distance approximately the length of said scanner;

additionally scanning the document to generate at least a second scanned image until the other end of the slidable platen reaches the other end of the scanner; and joining in the first scanned image and the second scanned image, thereby composing a resultant image having a size substantially the same as the document.

* * * * *